United States Patent Office 3,259,342
Patented July 5, 1966

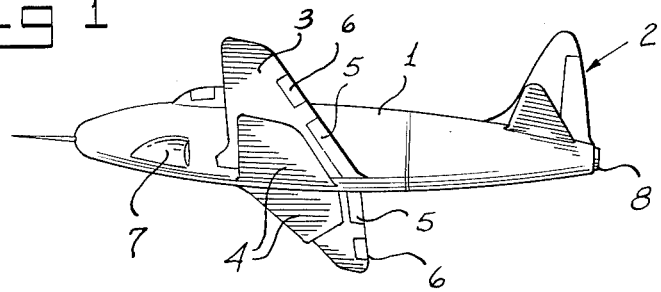
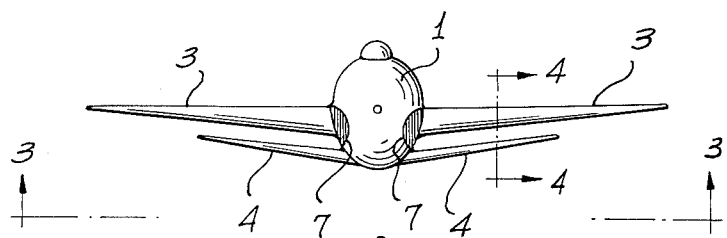
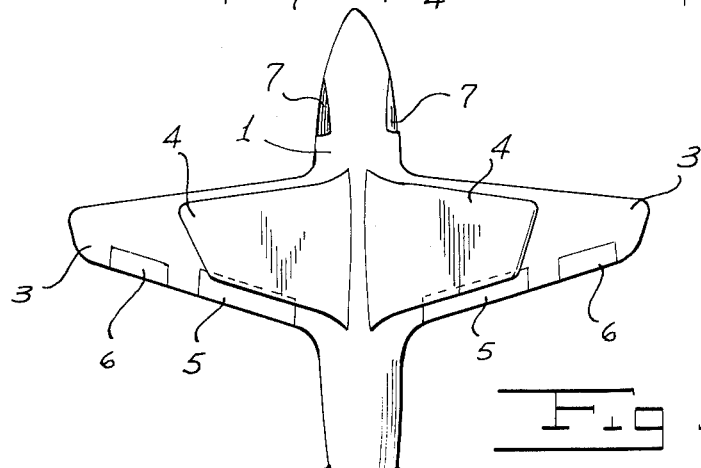
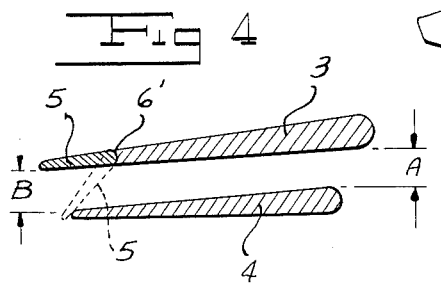

3,259,342
AIRPLANES
Peter P. Kessery, 69 Prescott Ave., Hawthorne, N.J.
Filed Aug. 19, 1964, Ser. No. 390,522
3 Claims. (Cl. 244—45)

This invention relates to improvements in airplanes and more particularly to the wing arrangement provided therefor.

Airplanes are usually constructed with single main wings that are adequate for sustaining flight. However, these require relatively long runways for take-off and landing, which are not often available for the purpose. Moreover, the single wing presents problems of stability and maneuverability, especially in times of emergency.

One object of this invention is to overcome these objections and to improve the construction of the airplane, especially with respect to the wing arrangement.

Another object of the invention is to provide an aircraft requiring a shorter length of runway for taking off and landing and having a lower rate of descent.

Still another object of the invention is to increase the stability and maneuverability of the airplane in flight by improving the wing arrangement thereof.

These objects may be accomplished, according to one embodiment of the invention, by providing a single main wing with an auxiliary wing beneath the main wing, but of smaller area, both transversely and longitudinally, and yet is of the same general type of wing structure projecting outwardly in a straight line from the body or fuselage. It is preferred that the space between the leading edges of the wings be smaller than the space between the trailing edges thereof. This space between the trailing edges may be controlled by suitable ailerons or flaps which will provide a braking action, resulting in a slowing of the speed of the plane, particularly in landing, and allowing a steeper descent.

This embodiment of the invention is illustrated in the accompanying drawings, in which:

FIG. 1 is a perspective view of an airplane embodying the invention;

FIG. 2 is a front elevation thereof;

FIG. 3 is a bottom plan view thereof, taken on the line 3—3 in FIG. 2; and

FIG. 4 is a cross section through the wing arrangement on the line 4—4 in FIG. 2.

The invention is shown as applied to an airplane of a conventional type, having a main body or fuselage, generally indicated at 1, with suitable rudder and stabilizing means at the rear thereof, as indicated at 2.

The single main wing is formed of wing sections 3 extending laterally in straight lines, approximately midway of the height of the body 1. These main wing sections 3 may be inclined slightly with their upper surfaces having a dihedral angle of less than 180°, as illustrated in FIG. 2, as they extend outwardly from the mid portion of the body 1.

Spaced downwardly from the main wing sections 3 is an auxiliary wing formed by wing sections 4 which extend outwardly in straight lines from the body 1 approximately tangent to the lower surface of the body 1. The wing sections 4 extend approximately parallel with the wing sections 3, but are approximately half the area thereof, as will be apparent from FIG. 3.

As shown also in FIG. 4, the leading edges of the wing sections 3 and 4 are offset from each other, with the leading edge of the wing section 4 spaced rearwardly from the leading edge of the wing section 3. The rear edge of the wing section 4, however, is spaced forwardly from the rear edge of the wing section 3.

Moreover, as shown in FIG. 4, the wing sections 3 and 4 are inclined with respect to each other. As illustrative thereof, the leading edges of these wing sections 3 and 4 are shown as spaced apart a distance indicated at A in FIG. 4, while the trailing edges of the wing sections 3 and 4 are spaced apart a distance, indicated at B in FIG. 4. The disances A and B are substantially uniform along the length of the wing sections 3 and 4, but the distance B is greater than A so as to provide an expanding area for the air in passing between the wing sections 3 and 4.

The trailing edges of the main wing sections 3 are provided with the usual flaps 5 and ailerons 6, suitably mounted as, for example, on hinges 6' or other means which will permit the flaps to be directed downward substantially to the trailing edges of the auxiliary wing sections 4, as illustrated in FIG. 4.

The ailerons 6 are spaced outwardly from the auxiliary wing sections 4, so that there is no interference with the movement of the ailerons. The conventional flaps 5 extend along the trailing edge of the main wing 3 above the trailing edge of the auxiliary wing 4. The auxiliary wing 4 should be sufficiently close to the wing 3 that the flaps 5 can substantially close the space B therebetween. The flaps 5 may be lowered for controlling the flow of air between the wings. When the flaps are fully lowered, as shown in FIG. 4, they engage the trailing edge of the auxiliary wing 4 and substantially shut off the flow of air. The effect achieved by shutting off the flow of air is to increase the lift-drag ratio at take-off and landing speeds. Therefore, the speeds for taking off and landing are reduced.

The conventional landing gear, fuel supply, aileron and flap controls, and other controls of the airplane are not illustrated because any suitable or desired form thereof may be used. Likewise, the propelling means may be of any suitable or desired type such, for example, as a conventional jet engine or engines. It may be enclosed within the body 1 or secured to the wing structure, as desired. I have illustrated in the drawings intake openings 7 at opposite sides of the body 1 and an exhaust at 8 at the rear end of the body, merely as an example.

The auxiliary wing 4 may be used as an auxiliary gas tank, if desired, in the usual manner of storing fuel within the wing structures. Other conventional practices may be followed with respect to the airplane to which this invention is applied.

Since the zone of maximum lift occurs intermediate the ends of the main wing structure 3, the auxiliary wing structure 4 extends under the intermediate portion of the main wing and thereby provides the maximum lift by the main wing, with a minimum of drag due to the auxiliary wing structure 4. For optimum flight characteristics, the area of auxiliary wing structure 4 should not exceed one-half the area of the main wing 3 and the length of the auxiliary wing structure 4 should not be greater than two-thirds of the length of the main wing 3.

The auxiliary wing structure provided at 4 of the character described has the property of keeping the plane in stable position for faster and shorter take-off and of slowing the descent of the airplane for shorter landing. It also increases the stability and maneuverability wherever it is needed, especially in times of emergency.

While the invention has been illustrated and described in one embodiment, it is recognized that variations and changes may be made therein, without departing from the subject matter of the claims.

I claim:

1. An airplane comprising a body having a main wing extending laterally in a straight line from the body substantially midway of the height thereof, and an auxiliary wing extending laterally in a straight line from the body substantially parallel with the main wing and approximately tangent with the lower surface of the body, said auxiliary wing being of appreciably smaller area than the main wing, with the forward edge of the auxiliary wing spaced rearwardly from the forward edge of the main wing and with the trailing edge of the auxiliary wing spaced forwardly of the trailing edge of the main wing, said auxiliary wing being of appreciably shorter length than the length of the main wing, and flaps mounted on the rear edge of the main wing for downward movement substantially into closed relation with the trailing edge of the auxiliary wing and ailerons mounted on the rear edge of the main wing and spaced outwardly from the ends of the adjacent auxiliary wing.

2. An airplane according to claim 1, wherein the auxiliary wing has an area no greater than one-half the area of the main wing.

3. An airplane according to claim 1, including jet engine means for propelling the airplane.

References Cited by the Examiner

UNITED STATES PATENTS

| | | | |
|---|---|---|---|
| 1,559,091 | 10/1925 | Hall | 244—42 |
| 1,769,487 | 7/1930 | Boney | 244—45 |
| 2,007,319 | 7/1935 | Wurth | 244—46 |

MILTON BUCHLER, *Primary Examiner.*

B. BELKIN, *Assistant Examiner.*